United States Patent [19]
Yoshida et al.

[11] 3,725,725
[45] Apr. 3, 1973

[54] OSCILLOSCOPE APPARATUS

[75] Inventors: Susumu Yoshida; Yoshio Ishigaki, both of Tokyo, Japan

[73] Assignee: Sony Corporation, Tokyo, Japan

[22] Filed: Oct. 3, 1969

[21] Appl. No.: 863,543

[52] U.S. Cl. .......................315/26, 315/25, 328/104
[51] Int. Cl. ..............................................H01j 29/74
[58] Field of Search............328/104, 154, 137, 102; 315/24, 26; 307/243

[56] References Cited

UNITED STATES PATENTS 3,599,034   8/1971   Fischer et al. ............................315/26

*Primary Examiner*—Benjamin A. Borchelt
*Assistant Examiner*—H. A. Birmiel
*Attorney*—Lewis H. Eslinger, Alvin Sinderbrand and Curtis, Morris & Safford

[57] ABSTRACT

A single-trace type oscilloscope which may be of small size and light weight is adapted for multi-trace operation by providing an adapter connected with the oscilloscope, with minimal alteration of the latter, and which is selectively operable to cause the single-trace type oscilloscope to display a selected one of a plurality of input signals, to display the input signals simultaneously or to display the input signals alternately during successive sweep periods or during successive periods having a high frequency as compared with the sweep frequency.

8 Claims, 3 Drawing Figures

OSCILLOSCOPE APPARATUS

This invention relates generally to oscilloscopes, and more particularly is directed to the provision of an adapter by which multi-trace operation can be obtained with a conventional oscilloscope of the single-trace type.

Although relatively small and light weight oscilloscopes of the single-trace type have been produced, the desirable small size and light weight characteristics of the oscilloscope cannot be maintained when such instrument is provided with the additional circuits, controls and the like that are required for the multi-trace operation of the oscilloscope. An adapter has been proposed for attachment to an oscilloscope of the single-trace type so as to make possible the multi-trace operation thereof. However, in the case of such previously proposed adapter, the latter was of complicated and expensive construction, and extensive alteration of the single-trace oscilloscope was required to make possible its use with such adapter. Further, the previously proposed adapter for affording multi-trace operation to a single-trace oscilloscope did not provide satisfactory characteristics in multi-trace operation.

Accordingly, it is an object of this invention to provide a single-trace type oscilloscope, which may be small and light weight, with an adapter capable of causing the fully satisfactory multi-trace operation of the oscilloscope.

Another object is to provide an adapter which is of simple construction and operation, and which may be attached to a single-trace type oscilloscope with minimal alterations of the latter from its original state so as to make possible the multi-trace operation of the oscilloscope.

In accordance with an aspect of this invention, a conventional single-trace type oscilloscope having a signal input and an unblanking circuit generating gate pulses at the sweep frequency of the oscilloscope is provided with an adapter for selectively causing multi-trace display by the oscilloscope and which comprises two or more channels for receiving respective input signals and extending to a signal output connected with the signal input of the oscilloscope, a selector switch selectively disposable in two or more first positions in each of which a respective selected input signal is transmitted through the corresponding channel to the signal output for display by the oscilloscope, the selector switch further being selectively disposable in at least second and third positions, a terminal connected with the unblanking circuit of the oscilloscope to receive the mentioned gate pulses therefrom, circuit means operative in response to the gate pulses when the selector switch is in its second position to cause two of the input signals to be transmitted through the respective channels to the signal output alternately during successive sweep periods of the oscilloscope for alternate display by the latter during such successive sweep periods, circuit means operative when the selector switch is in its third position to supply to the terminal a blanking signal at a high frequency relative to the sweep frequency for causing blanking of the oscilloscope at such high frequency, and circuit means operative in response to the high frequency blanking signal to cause the two input signals to be transmitted through the respective channels to the signal output alternately during successive pulses of the high frequency blanking signal for alternating chopped display by the oscilloscope during each sweep period of the latter.

In accordance with the invention, the selector switch of the adapter characterized, as above, may be further selectively disposable in a fourth position to cause the two input signals to be transmitted through their respective channels and mixed at the signal output for display of the resulting mixed signal by the oscilloscope.

The above, and other objects, features and advantages of this invention, will be apparent in the following detailed description of an illustrative embodiment which is to be read in connection with the accompanying drawings, wherein.

Figure 1:
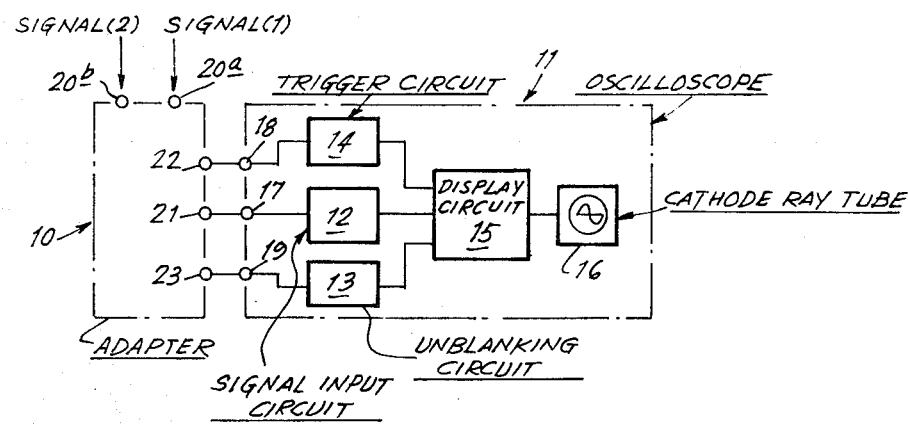
FIG. 1 is a schematic block diagram of a conventional single-trace oscilloscope to which an adapter according to this invention is attached for permitting multi-trace operation of the oscilloscope.

Referring to the drawings in detail, and initially to FIG. 1 thereof, an adapter 10 according to this invention is there shown connected with a conventional single-trace oscilloscope 11 so as to permit multi-trace operation of such oscilloscope. The conventional oscilloscope 11 generally includes the usual signal input circuit 12, unblanking circuit 13 and trigger circuit 14 connected with a display circuit 15 which is, in turn, connected with a cathode ray tube 16. Further, the conventional single-trace oscilloscope 11 is shown to have a single input terminal 17 connected with signal input circuit 12 to receive the signal to be displayed by tube 16, and a terminal 18 connected with trigger circuit 14 to receive a signal by which the oscilloscope is to be synchronized, for example, so that each sweep will start at the same point on the signal wave form. Oscilloscope 11 is further provided with a terminal 19 connected with unblanking circuit 13 so as to receive from the latter gate pulses which are generated therein at the sweep frequency of the oscilloscope, as represented at B on FIG. 3, and further to receive from the adapter 10, as hereinafter described in detail, a blanking signal at a high frequency relative to the sweep frequency, for example, as indicated at D on FIG. 3, and for supplying such blanking signal to circuit 13 so as to cause blanking of the oscilloscope at the mentioned high frequency.

Figure 3:
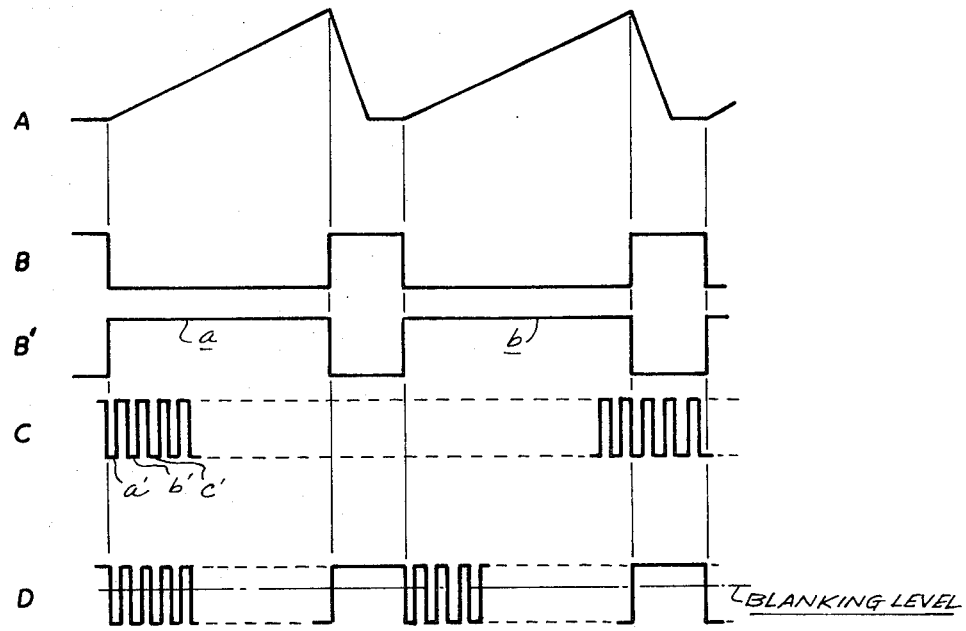
FIG. 3 is a graphic representation of various wave forms to which reference will be made hereinafter in explaining the operation of the adapter of FIG. 2.

The adapter 10 is seen to have two signal input terminals 20a and 20b for respectively receiving a signal (1) and a signal (2), a signal output terminal terminal 21 suitably connected with terminal 17 of the oscilloscope for supplying to the latter the signal or signals to be displayed, a signal output terminal 22 connected with oscilloscope terminal 18 for supplying to the oscilloscope the signal by which synchronization is to be achieved, and a terminal 23 suitably connected with oscilloscope terminal 19 for receiving the gate pulses (B on FIG. 3) from the oscilloscope and for transmitting to the latter the blanking signal (D on FIG. 3).

Figure 2:
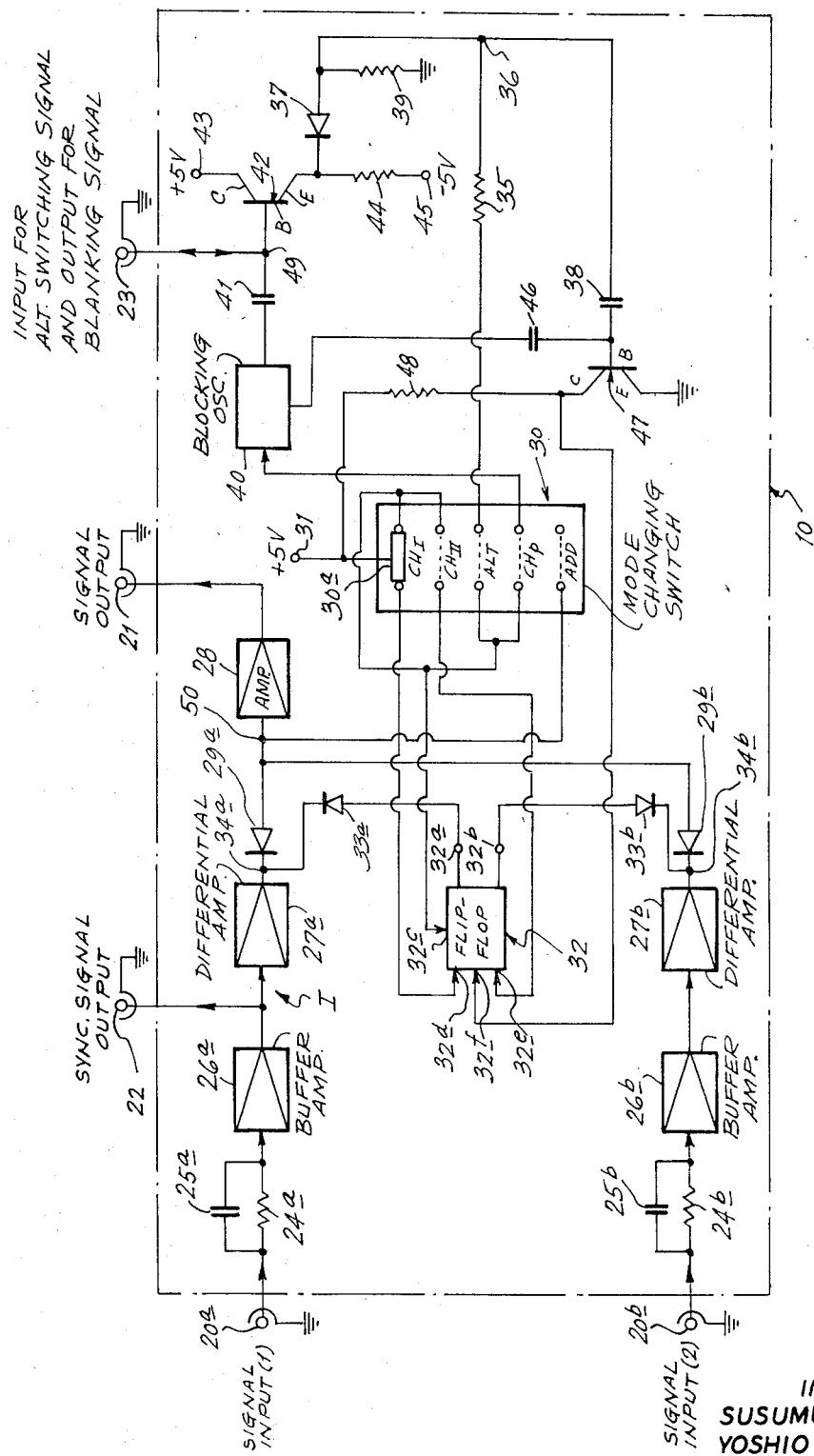
FIG. 2 is a schematic block and wiring diagram of an adapter according to an embodiment of this invention.

Referring now to FIG. 2, it will be seen that, in an adapter 10 according to an embodiment of this invention as there shown, signal input terminal 20a is connected with a first channel (I) including, in sequence, a resistor 24a and capacitor 25a connected in parallel, a buffer amplifier 26a and a differential amplifier 27a, and similarly signal input terminal 20b is connected with a second channel II including, in sequence, a resistor 24b and capacitor 25b connected in parallel, a buffer amplifier 26b and a differential amplifier 27b. Further, the output of buffer amplifier 26a in channel I is connected to signal output terminal 22, and the outputs of differential amplifiers 27a and 27b are both connected to the input of a common amplifier 28 through diodes 29a and 29b, respectively. The output terminal of amplifier 28 is connected to the signal output terminal 21 of the adapter.

The illustrated adapter 10 is further shown to comprise a mode changing or selector switch 30 which is interposed between a terminal 31 connected with a power source, for example a battery, and a bi-stable multivibrator, for example, a flip-flop circuit 32. Flip-flop circuit 32 has two output terminals 32a and 32b, and may be of conventional design so as to be operative, when energized by the connection of its terminal 32c with power source terminal 31 by way of selector switch 30, to assume a first state, in which negative and positive outputs are produced at terminals 32a and 32b, respectively, or a second state, in which the opposite polarities at output terminals 32a and 32b are reversed. Flip-flop circuit 32 is further shown to have inputs 32d and 32e which, upon the application of a voltage thereto, cause the flip-flop circuit to assume its first and second states, respectively, and an input 32f intended to receive voltage pulses so as to cause flip-flop circuit 32 to assume its first and second states alternately in response to the reception of successive voltage pulses. Output terminal 32a of the flip-flop circuit is connected through a diode 33a to a junction 34a between amplifier 27a and diode 29a of channel 1 and, similarly, output terminal 32b is connected through a diode 33b to a junction 34b between amplifier 27b and diode 29b of channel II. Thus, when flip-flop circuit 32 is in its first state to produce a negative output at terminal 32a and a positive outlet at 32b, diode 29a will be made conductive and diode 29b will be non-conductive, and conversely, when flip-flop circuit 32 is in its second state to provide a negative output at terminal 32b and a positive outlet at terminal 32a, diode 29a will be non-conductive and diode 29b will be conductive. It will be apparent that, when diode 29a is made conductive, as aforesaid, the first signal (1) will pass from channel I through amplifier 28 to appear at signal output terminal 21, whereas, when diode 29b is made conductive, the second signal (2) will pass from channel II through amplifier 28 to appear at signal output terminal 21. Further, it will be apparent that, when diodes 29a and 29b are simultaneously made conductive, as hereinafter described, both signals (1) and (2) will pass through amplifier 28 to provide a mixed signal output at terminal 21.

The mode changing or selector switch 30 is shown to include a slider or movable contact 30a connected with power source terminal 31 and being selectively engageable with sets of fixed contacts indicated at $CH_I$, $CH_{II}$, ALT, CHP and ADD. One contact of each of the sets of fixed contacts $CH_I$, $CH_{II}$, ALT and CHP is connected to terminal 32c of the flip-flop circuit so that the latter is energized or made operative by voltage from terminal 31 when slider 30a is positioned to engage any one of the identified sets of fixed contacts. Further, the other contacts of contact sets $CH_I$ and $CH_{II}$ are respectively connected to terminals 32d and 32e of flip-flop circuit 32 so that, when slider 30a engages contacts $CH_I$, the voltage from terminal 31 is also applied to terminal 32d to cause the flip-flop circuit to assume its first state and thus cause signal (1) to appear at signal output terminal 21 for display by oscilloscope 11 whereas, when slider 30a is engaged with contacts $CH_{II}$, voltage is applied to terminal 32e to cause flip-flop circuit 32 to assume its second state and thereby result in the transmission of signal (2) to terminal 21 for display of the second signal by the oscilloscope.

The other contact of contact set ALT is shown to be connected through a resistor 35 to a junction 36 between a diode 37 and a capacitor 38 so that, when slider 30a is engaged with contact set ALT, the source voltage is applied from terminal 31 to diode 37 as a forward bias on the latter. A resistor 39 is connected between junction 36 and diode 37 to ground to act as a voltage divider for ensuring that the forward bias voltage applied to diode 37 has the desired value.

The other contact of contact set CHP is connected to a blocking oscillator 40 so that the latter will be energized and made operative by the voltage from terminal 31 when slider 30a is positioned to engage contact set CHP. The output terminal of blocking oscillator 40 is connected through a capacitor 41 to the base electrode of a transistor 42 which has its collector electrode connected to a positive power source terminal 43 and its emitter electrode connected through a resistor 44 to a negative power source terminal 45. The output terminal of blocking oscillator 40 is further connected through a capacitor 46 to the base electrode of a transistor 47. The emitter electrode of transistor 42 is further connected through diode 37 and capacitor 38 to the base electrode of transistor 47 in which the emitter electrode is connected to ground and the collector electrode is connected through a resistor 48 to power source terminal 31 and also connected to the input terminal 32a of flip-flop circuit 32. Further, terminal 23 of adapter 10 is connected to a junction 49 between capacitor 41 and the base electrode of transistor 42.

It will also be seen that one of the contacts of contact set ADD is connected to a junction 50 between amplifier 28 and channels I and II so that, when slider 30a is positioned to engage contact set ADD, voltage will be applied from power source terminal 31 as a forward bias to both of diodes 29a and 29b, whereby both of diodes 29a and 29b will be rendered simultaneously conductive and signals (1) and (2) will be simultaneously applied to the input of amplifier 28 to provide a mixed signal output at terminal 21.

The above described adapter 10, when connected to the oscilloscope 11 in the manner described with reference to FIG. 1, operates as follows:

When selector switch 30 is disposed to engage its slider 30a with contact set $CH_I$, flip-flop circuit 32 is in its first state to cause diode 29a to be conductive and diode 29b to be non-conductive, whereby only signal (1) is passed through amplifier 28 to signal output terminal 21 and from the latter to oscilloscope terminal 17 for display by the oscilloscope.

When switch 30 is disposed to engage its slider 30a with contact set $CH_{II}$, flip-flop circuit 32 is in its second state to cause diode 29b to be conductive and diode 29a to be non-conductive so that only signal (2) is passed through amplifier 28 to signal output terminal 21 and then to oscilloscope terminal 17 for display only of such signal by the oscilloscope.

When switch 30 is positioned to engage its slider 30a with contact set ALT, flip-flop circuit 32 is energized by voltage from terminal 31 and a portion of such voltage is also applied through resistor 35 as a forward bias on diode 37 so that the latter is made conductive. The gate pulses (B on FIG. 3) generated in the unblanking circuit 13 of oscilloscope 11 in synchronism with the sweep signal (A on FIG. 3) are transmitted from oscilloscope terminal 19 to terminal 23 of the adapter for application, at junction 49, to the base electrode of transistor 42. Such gate pulses are applied through transistor 42, conducting diode 37 and capacitor 38 to the base electrode of transistor 47, and a corresponding inverted train of pulses or switching signal (B' on FIG. 3) is derived at the collector electrode of transistor 47 and supplied to terminal 32f of flip-flop circuit 32. This switching signal B' is effective to drive flip-flop circuit 32 so that the latter alternately assumes its first and second states during the successive rectangular pulses of signal B', that is, during the successive sweep periods of oscilloscope 11. Thus, for example, during pulse a of switching signal B', flip-flop circuit 32 will assume its first state in which only the signal (1) is supplied to terminal 21 for display by oscilloscope 11 during the corresponding sweep period, and during the next pulse b of switching signal B', the flip-flop circuit is switched to its second state to supply only the signal (2) to terminal 21 for display by the oscilloscope during the corresponding sweep period. The foregoing operations continue during the successive pulses of switching signal B' so that the signals (1) and (2) are alternately displayed by the oscilloscope during the successive sweep periods.

When switch 30 is positioned to engage its slider 30a with contact set CHP, blocking oscillator 40 is made operative by the voltage applied thereto from terminal 31 and produces pulses at a frequency, for example, 1000 KHz, that is high in relation to the frequency of the sweep signal, as indicated at C on FIG. 3. Such high frequency signal (C on FIG. 3) is applied to terminal 23 by way of capacitor 41 and also to the base electrode of transistor 47 by way of capacitor 46. As a result of the high frequency pulsed signal (C on FIG. 3) applied to the base electrode of transistor 47, a similar, but inverted high frequency pulsed signal is obtained from the collector electrode of transistor 47 and supplied to terminal 32f of the flip-flop circuit so that the latter assumes its first and second states alternately during successive high frequency pulses, for example, during the successive high frequency periods indicated at a', b' and c' on FIG. 3. The first and second states of flip-flop circuit 32 alternating at a high frequency will cause diodes 29a and 29b to alternately assume their conductive conditions at the same high frequency, whereby the first and second signals (1) and (2) will be alternately supplied to terminal 21 for alternate display by oscilloscope 11 during each sweep period of the latter. Since the two signals are alternately displayed by the oscilloscope for very short periods during each sweep period of the oscilloscope, both signals will be observed substantially at the same time on the oscilloscope screen. Since the high frequency signal at the output of blocking oscillator 40 is also applied to terminal 23 and, from the latter, by way of terminal 19 to the unblanking circuit 13 of the oscilloscope, the high frequency pulsed signal (C on FIG. 3) is combined with the gate pulses (B on FIG. 3) to provide a combined blanking signal (D on FIG. 3) for operation of oscilloscope 11. Thus, the bright lines which would otherwise appear between the traces of the first and second signals (1) and (2) alternately supplied to the oscilloscope input 17 are prevented by the high frequency pulses of the blanking signal D (FIG. 3) occurring during each sweep period, while the portions of blanking signal D corresponding to the pulses of gate pulses B (FIG. 3) serve to cause blanking of the oscilloscope in the intervals between successive sweep periods.

When selector switch 30 is positioned to engage its slider 30a with fixed contacts ADD, the voltage at terminal 31 is applied as a forward bias to each of diodes 29a and 29b, whereby, as previously mentioned, both signals (1) and (2) appear as a mixed signal at terminal 21 for display of such mixed signal by oscilloscope 11.

In all of the operating modes of adapter 10 described above, the first signal (1) appears at terminal 22 and is supplied to terminal 18 of the oscilloscope as an external trigger signal in order to synchronize the oscilloscope.

The power sources connected with terminals 31, 43 and 45 may be contained within the oscilloscope 11, or an independent power source, for example, a battery, may be provided in the adapter 10.

It will be apparent from the foregoing that the adapter 10 makes it possible to effect multi-trace operation of the oscilloscope 11 of the single-trace type with only minimal modifications or alterations of the oscilloscope which may be of small size and light weight and designed for battery operation. Further, by suitably manipulating the selector switch 30, the adapter 10 makes it possible to display and observe various kinds of wave forms with excellent characteristics.

Although an illustrative embodiment of the invention has been described in detail herein, it should be understood that the invention is not limited to that precise embodiment, and that various changes and modifications may be effected therein by one skilled in the art without departing from the scope or spirit of the invention.

What is claimed is:

1. In combination with a single-trace type oscilloscope having a signal input and unblanking circuit means generating gate pulses at the sweep frequency of the oscilloscope, an adapter device for selectively causing multitrace display by said oscilloscope of the single-trace type, said adapter device comprising: means for receiving a plurality of input signals; a signal output connected with said signal input of the oscilloscope; selector switch means selectively disposable in a plurality of first positions corresponding in number to said input signals and in each of which a respective selected input signal is transmitted to said signal output for display of said selected input signal by said oscilloscope, said selector switch means further being selectively disposable in at least second and third positions; terminal means connected with said unblanking circuit means of the oscilloscope to receive said gate pulses therefrom; switching circuit means operative in response to said gate pulses when said selector switch means is in said second position to cause two of said input signals to be transmitted to said signal output alternately during successive sweep periods of said oscilloscope for alternate display by the latter during said successive sweep periods; means operative when said selector switch means is in said third position to supply to said terminal means a blanking signal at a high frequency relative to said sweep frequency for causing blanking of said oscilloscope at said high frequency; means to supply said high frequency blanking signal to said switching circuit to cause said two input signals to be transmitted to said signal output alternately between successive pulses of said high frequency blanking signal for alternating chopped display by said oscilloscope during each sweep period of the latter; and additional switch means connected between said terminal means and said switching circuit means to disconnect said terminal means from said switching circuit means when said selector switch means is in said third position.

2. The combination according to claim 1, in which first and second channels are provided in said adapter device for transmitting said two input signals, respectively, to said signal output, said first and second channels each being adapted to be selectively rendered conductive and non-conductive, flip-flop circuit means is connected with said first and second channels and is operative, in a first state, to render said first and second channels conductive and non-conductive, respectively, and, in a second state, to render said first and second channels non-conductive and conductive, respectively, said flip-flop circuit means is operative in said first state, when said selector switch means is in one of said first positions, and in said second state, when said selector switch means is in another of said first positions, said means operative in response to said gate pulses when said selector switch means is in said second position is effective to dispose said flip-flop circuit means in said first and second states alternately during said successive sweep periods, and said means operative in response to said high frequency blanking signal is effective to dispose said flip-flop circuit means in said first and second states alternately during successive pulses of said blanking signal when said selector switch means is in said third position.

3. The combination according to claim 2, in which said selector switch means is further selectively disposable in a fourth position, said flip-flop circuit means is operative only in said first, second and third positions of said selector switch means, and means are provided to render said first and second channels simultaneously conductive when said selector switch means is in said fourth position to cause mixing of said input signals at said signal output.

4. The combination according to claim 3, in which said oscilloscope has trigger circuit means, and said adapter device has means extending from one of said channels to supply the respective input signal to said trigger circuit means for synchronization of said oscilloscope in all of said positions of the selector switch means.

5. An adapter device for permitting multitrace display by a signle-trace type oscilloscope, said adapter device comprising: means for receiving a plurality of input signals; a single signal output adapted for connection to the signal input of the oscilloscope; selector switch means selectively disposable in a plurality of first positions corresponding in number to said input signals and in each of which a respective input signal is transmitted to said signal output, said selector switch means further being selectively disposable in at least second and third positions; terminal means adapted to receive from the unblanking circuit of the oscilloscope gate pulses at the sweep frequency of the oscilloscope; switching circuit means connected with said terminal means and being operative in response to the reception of the gate pulses when said selector switch means is in said second position to cause two of said input signals to be transmitted to said signal output alternately during successive intervals between the gate pulses; means operative when said selector switch means is in said third position to supply to said terminal means a blanking signal at a frequency that is high in relation to the sweep frequency; means to supply said high frequency blanking signal to said switching circuit to cause said two signals to be transmitted to said signal output alternately between successive pulses of said high frequency blanking signal; and additional switch means connected between said terminal means and said switching circuit means to disconnect said terminal means from said switching circuit means when said selector switch means is in said third position.

6. An adapter device according to claim 5, in which first and second channels are provided in said adapter device for transmitting said two input signals, respectively, to said signal output, said first and second channels each being adapted to be selectively rendered conductive and non-conductive, flip-flop circuit means is connected with said first and second channels and is operative, in a first state, to render said first and second channels conductive and non-conductive, respectively, and, in a second state, to render said first and second channels non-conductive and conductive, respectively, said flip-flop circuit means is operative in said first state, when said selector switch means is in one of said first positions, and in said second state, when said selector switch means is in another of said first positions, said means operative in response to said gate pulses when said selector switch means is in said second position is effective to dispose said flip-flop circuit means in said first and second states alternately during said successive sweep periods, and said means operative in response to said high frequency blanking signal is effective to dispose said flip-flop circuit means in said first and second states alternately during successive pulses of said blanking signal when said selector switch means is in said third position.

7. An adapter device according to claim 6, in which said selector switch means is further selectively disposable in a fourth position, said flip-flop circuit means is operative only in said first, second and third positions of said selector switch means, and means are provided to render said first and second channels simultaneously conductive when said selector switch means is in said fourth position to cause mixing of said input signals at said signal output.

8. An adapter device according to claim 7, in which a second signal output is provided and adapted for connection to the trigger circuit of the oscilloscope, and said second signal output is connected with one of said channels to receive the respective input signal for synchronizing purposes in all of said positions of the selector switch means.

* * * * *